United States Patent [19]

Falk et al.

[11] Patent Number: 4,899,042

[45] Date of Patent: Feb. 6, 1990

[54] INTEGRATED OPTIC FIELD SENSOR CONSISTING OF AN INTERFEROMETER FORMED IN SUBSTRATE

[75] Inventors: Robert A. Falk, Renton; Raymond W. Huggins, Mercer Island, both of Wash.

[73] Assignee: The Boeing Company, Seattle, Wash.

[21] Appl. No.: 121,466

[22] Filed: Nov. 17, 1987

[51] Int. Cl.$^4$ .................... H01J 40/14; G01D 5/34
[52] U.S. Cl. ................... 250/227; 250/231 R; 324/96
[58] Field of Search ............. 250/227, 231 R; 356/345, 346; 324/96, 244; 350/96.14, 96.13, 96.12, 96.11

[56] References Cited

U.S. PATENT DOCUMENTS

| | | | |
|---|---|---|---|
| 4,037,263 | 7/1981 | Moeckel | 360/114 |
| 4,300,814 | 11/1981 | Carenco | 350/96.2 |
| 4,340,272 | 7/1982 | Papuchon et al. | 350/96.14 |
| 4,359,261 | 11/1982 | Levi | 350/96.14 |
| 4,433,291 | 1/1984 | Yariv | 324/244 |
| 4,433,895 | 2/1984 | Puech | 350/96.3 |
| 4,522,495 | 6/1985 | Shajenko | 250/227 |
| 4,552,457 | 11/1985 | Giallorenzi et al. | 250/227 |
| 4,561,718 | 12/1985 | Nelson | 350/96.4 |
| 4,564,289 | 1/1986 | Spillman, Jr. | 324/244 |
| 4,583,817 | 4/1986 | Papuchon | 350/96.14 |
| 4,589,728 | 5/1986 | Dyott | 350/96.30 |
| 4,591,786 | 5/1986 | Koo et al. | 324/96 |
| 4,603,296 | 7/1986 | Koo et al. | 324/244 |
| 4,668,093 | 5/1987 | Cahill | 356/345 |

OTHER PUBLICATIONS

Gaillorenzi, Bucaro, Dandridge, Sigel, Jr., Cole, Rashleigh and Priest, "Optical Fiber Sensor Technology", *IEEE Journal of Quantum Electronics*, vol. QE-18, No. 4 (Apr. 1982).
Note, "Optical-Fibre Sensors", *IEE Proceedings*, vol. 132, Pt. J., No. 4 (Aug. 1985).
Bucholtz, Koo, Kersey & Dandridge, "Fiber Optic Magnetic Sensor Development", Naval Research Laboratory, Optical Sciences Division, Code 6570, Washington, D.C.
Izutsu, Enokihara and Sueta, "Integrated Optic Temperature and Humidity Sensors", *Journal of Lightwave Technology*, vol. LT-4, No. 7 (Jul. 1986).
D. A. Jackson, "Monomode Optical Fibre Interferometers for Precision Measurement", *Physics E. Science Instrument*, vol. 18 (United Kingdom), 981–1001 (1985).
B. Culshaw, "Optical Fibre Sensing and Signal Processing", Peter Peregrinus Ltd, London, UK (1984).
R. E. Epworth, "The Temporal Coherence of Various Semiconductor Light Sources Used in Optical Fibre Sensors", *Fiber-Optic Rotation Sensors and Other Related Technologies*, (Springer-Verlag, Berlin, Heidelberg, New York), 237–249 (1982).
Laybourn and Lamb; "Integrated Optics: A Tutorial Review"; Jul./Aug. 1981; pp. 397–413.

*Primary Examiner*—David C. Nelms
*Assistant Examiner*—William L. Oen
*Attorney, Agent, or Firm*—Christensen, O'Connor, Johnson & Kindness

[57] ABSTRACT

Integrated optic sensors for measuring electric, magnetic and temperature fields. Each sensor comprises an interferometer that includes first and second arms, each arm comprising an optical waveguide formed in a substrate. The interferometer includes a field sensitive material positioned adjacent the first arm for varying the optical path length of the first arm in accordance with the applied field. Electric, magnetic and temperature field sensors are provided that are based upon stress induced refractive index changes induced in the first arm. Electric and magnetic field sensors are disclosed based upon evanescent field coupling between the field sensitive material and the first arm. A dual ring resonator embodiment is also described.

14 Claims, 3 Drawing Sheets

INTEGRATED OPTIC FIELD SENSOR CONSISTING OF AN INTERFEROMETER FORMED IN SUBSTRATE

FIELD OF THE INVENTION

The present invention relates to integrated optic sensors for measuring fields such as electric fields, magnetic fields, and temperature fields.

BACKGROUND OF THE INVENTION

Over the past several years, there has been considerable development in the use of fiber optic based systems for sensing applications. An important class of high sensitivity sensors has been proposed based upon interferometers. The basis of a fiber optic interferometer sensor is the measurement of a physical parameter through the modulation of the optical path length or phase that it induces, either directly or indirectly, in the optical fiber. External parameters that can directly modulate the optical path length of an optical fiber include temperature, strain and pressure. Indirect modulation of optical path length typically occurs via an auxiliary sensing element bonded to the fiber. For example, hydrophones have been proposed using a Mach-Zehnder interferometer in which light from a coherent source is divided into reference and sensing fiber optic cables. The sensing fiber optic cable is formed into a sensing coil that is exposed to an acoustic field that causes phase modulation of light passing through the sensing coil. The phase modulation occurs because the acoustic field causes changes in the diameter of the fiber core, the length of the fiber, and the refractive indices of the core and cladding, with the length change being the dominant effect. A second example of an interferometer sensor is a fiber optic gyroscope based upon the Sagnac effect.

There are two main classes of fiber optic magnetic field sensors, namely, those based on magnetostriction devices, and those based on Faraday rotation sensors. The distinction between the two sensor classes lies in the physical mechanism on which they are based. The Faraday effect is a linear process involving a direct interaction between the external magnetic field and the light propagating in the fiber. The magnetostriction effect exploited in fiber sensors, on the other hand, is a nonlinear interaction between the external field and the magnetostrictive material, resulting in a distortion or strain of the material. The strain is transferred to the fiber, where it can affect the optical path length of the fiber core.

As both the propagation constants and length of an optical fiber vary when it is subjected to either a changing temperature or force, it is possible to use a fiber optic cable as a sensor for measurements of strain, displacement and temperature. In a typical temperature sensor, a Michelson interferometer arrangement is used, with the sensing arm having a different length than the reference arm. Polarimetric configurations have also been proposed for fiber optic temperature sensors, based on the use of a length of birefringent fiber.

In general, fiber optic field sensors have achieved sensitivities exceeding that available from other technologies, as well as a very high dynamic range, due in part to the linearity of the phase change with the quantity being measured. However, despite high sensitivity and range, prior fiber optic sensors have been beset by a number of practical problems. First, the physical size of a fiber optic sensor can be significant, and can limit the applicability and versatility of the sensor. For example, it has been estimated that for a fiber optic hydrophone to be competitive with other hydrophone technologies, approximately one kilometer of monomode fiber would be required in the sensing arm to achieve the necessary sensitivity. Second, the components of a fiber optic interferometer are mechanically sensitive, and can introduce vibration noise that can deteriorate the signal-to-noise ratio. Another limitation of a fiber optic interferometer is the inconvenience in insuring the stability of the operating point of the interferometer, that is, in maintaining the quadrature condition between the two interferometer arms. This has been successfully implemented by using a PZT cylinder energized via a feedback loop, but this system has the inherent disadvantage that the length modulation range of the PZT is, at most, $2\pi$. There is thus a resetting transient when the phase differential to be corrected drifts outside this value. Temperature drifts are the prime cause of relative phase fluctuations, and only very small temperature differences can be handled without the onset of noticeable transients. A further major problem with all fiber optic interferometric sensors to date has been that the absolute relative phase difference between the sensing and reference paths is lost when the system is switched off. Until this data loss problem is solved, interferometric fiber optic sensors are likely to be used only in specialized applications.

SUMMARY OF THE INVENTION

The present invention provides integrated optic sensors for measuring electric, magnetic and temperature fields. The sensors are compact and stable, and are suitable for use in a multiplexed sensor system comprising a plurality of sensors disposed along a common optical bus.

The integrated optic field sensor comprises an interferometer that includes first and second arms, each arm comprising an optical waveguide formed in a substrate. Each arm has first and second ends. The interferometer also includes field sensitive means positioned adjacent the first arm, the field sensitive means including means for varying the optical path length of the first arm in accordance with the applied field. Radiation is coupled into the first ends of the first and second arms, and radiation exiting the second ends is combined and interferes to produce an optical output signal having an amplitude that varies in strength with the applied field. Electric, magnetic and temperature field sensors are provided that are based upon stress induced refractive index changes in the first arm, and electric and magnetic field sensors are described based upon evanescent field coupling between the field sensing means and the first arm. A dual ring resonator embodiment is also provided.

DETAILED DESCRIPTION OF THE INVENTION

Figure 1:
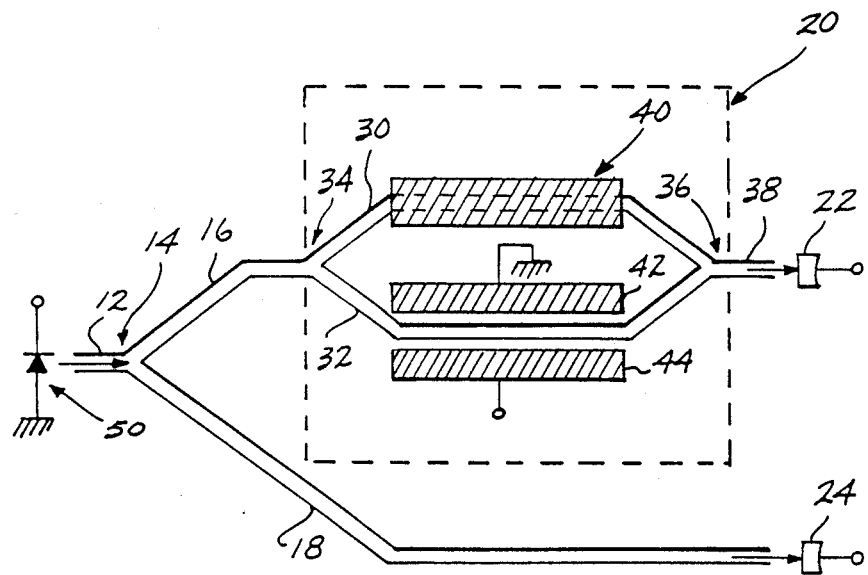
FIG. 1 is a schematic diagram of a first embodiment of the field sensor of the present invention.

One preferred general arrangement for the integrated optic field sensor of the present invention is illustrated in FIG. 1. The sensor comprises input waveguide 12, coupler 14, signal waveguide 16, monitor waveguide 18, interferometer 20 and photodetectors 22 and 24. Interferometer 20 comprises sensing arm (waveguide) 30, reference arm (waveguide) 32, couplers 34 and 36, field sensing material 40, and trim electrodes 42 and 44. Trim electrode 44 is connected to a suitable voltage source, and trim electrode 42 is grounded.

In operation, partially coherent electromagnetic radiation from source 50 is coupled into input waveguide 12, and divided by coupler 14 between signal waveguide 16 and monitor waveguide 18. The radiation coupled into monitor waveguide 18 is conveyed to photodetector 24, and photodetector 24 thereby provides an electrical signal that indicates the strength of the optical signal provided by source 50 in input waveguide 12. The radiation coupled into signal waveguide 16 travels to interferometer 20, and is evenly divided by coupler 34 between sensing arm 30 and reference arm 32. Radiation passing through the sensing and reference arms is combined by coupler 36, and conveyed from the coupler to photodetector 22 via an output waveguide 38. Interferometer 20 is fabricated by integrated optic techniques in a suitable substrate. For the embodiment of FIG. 1, and for other embodiments in which the optical path length of a reference arm is to be electrically adjusted, the substrate comprises an electrooptic material such as lithium niobate or gallium arsenide. However, if electrical path length adjustment is not required, then the substrate could also comprise any other suitable material such as glass or silicon. Preferably, waveguides 12, 16, 18 and 38, coupler 14, photodetectors 22 and 24 and interferometer 20 are all fabricated on a common substrate.

Field sensing material 40, described in greater detail below, modifies the optical path length of sensing arm 30 in accordance with the strength of an applied field. A voltage between trim electrodes 44 and 42 creates an electric field that modifies the optical path length of reference arm 32, and the trim electrodes may be used to provide a suitable operating point for the interferometer, as described below. When used as a stand alone sensor or in a system having a single sensor, the sensing and reference arms are constructed such that for all expected combinations of applied fields and trim voltage, the optical path length difference between the arms is less than the coherence length of source 50. Thus for a given voltage applied to the trim electrodes, variation in the applied field will vary the optical path length of sensing arm 30 while the optical path length of reference arm 32 remains constant, thereby producing fluctuations in the intensity of the radiation on output waveguide 38 due to the interference between radiation propagating in the two arms. These intensity variations will be converted into corresponding variations of an electric signal by photodetector 22. Thus, the output of photodetector 22, with respect to the source level signal provided by photodetector 24, provides a measure of the strength of the field sensed by field sensing material 40.

The field sensors of the present invention are well suited for use in a coherence multiplexed sensor system of the type described in commonly assigned U.S. patent application Ser. No. 121467, filed concurrently herewith, inventor R. W. Huggins, entitled Coherence Multiplexing of Optical Sensors. For use in such a system, a sensing interferometer is employed comprising sensing arm 30, reference arm 32 and field sensing material 40, and an associated detector interferometer is provided that includes a photodetector. The sensing and detector interferometers are coupled, together with other sensor/detector pairs, to a common optical bus. The optical path length difference of the sensing interferometer is selected such that the path length difference is greater than the coherence length of the optical source, and the detector interferometer has an optical path length that differs from that of the sensing interferometer by less than the source coherence length.

Figure 2:
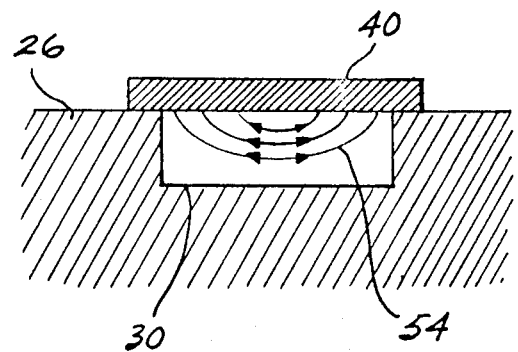
FIG. 2 is a partial diagram showing one means of operation of the field sensor.

A preferred embodiment of the field sensing technique of the present invention is illustrated in cross section in FIG. 2. In this arrangement, field sensing material 40 overlies sensing waveguide 30 in substrate 26. Field sensing material 40 is a material that expands or contracts in response to the field. Thus, for a temperature sensor, material 40 comprises a material having a high coefficient of thermal expansion, or at least a coefficient of thermal expansion different from that of substrate 26 and waveguide 30. For an electric field sensor, material 40 comprises a piezo-electric material, while for a magnetic field sensor, material 40 comprises a magnetostrictive material. In all cases, variation of the applied field causes differential expansion or contraction of field sensing material 40 with respect to the substrate and waveguide, which in turn causes stress in waveguide 30 in a direction that is normal to the lengthwise axis (i.e. the light propagation direction) of the waveguide. In FIG. 2 the stress lines are schematically illustrated by arrows 54. This stress results in stress induced refractive index changes in the waveguide that changes the waveguide's optical path length, thereby phase modulating the light passing through the waveguide. A suitable material that may be used to form waveguide 30 and that exhibits stress birefringence is lithium niobate. Adjustment of the amount of phase modulation is conveniently achieved by selecting the length of the field sensing material along the propagation direction, i.e., the direction out of the plane of the drawing in FIG. 2.

Figure 3:
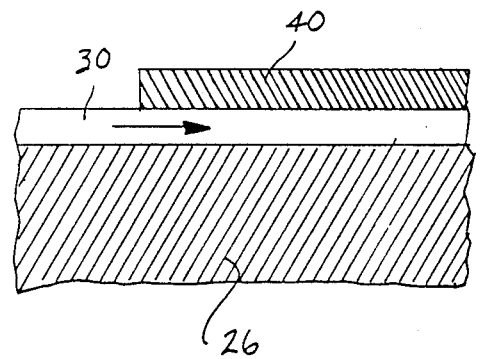
FIG. 3 is a partial diagram illustrating a second means of operation of the field sensor.

A second preferred embodiment of the field sensing technique of the present invention is shown in FIG. 3. In this embodiment, field sensing material 40 is selected to have an index of refraction that differs from the index of refraction of waveguide 30. In particular, the index of refraction of field sensing material 40 is either slightly less than, or greater than, the index of refraction of waveguide 30. In addition, the index of refraction of either the field sensing material or the waveguide, or both, are affected by the applied field, such that the difference between the indices varies with the strength of the field. In such an arrangement, a fraction of the optical power in the waveguide will be present in the material 40 in the form of an evanescent field, and the phase of this fraction will vary with the applied field. Variations in the field strength will therefore provide the necessary overall phase modulation. For an electric field sensor, field sensing material 40 comprises an electro-optic material having an index of refraction that meets the criteria stated above, such that the index of refraction of the field sensing material is either slightly less than, or greater than, the index of refraction of the waveguide, and such that the difference between the indices varies with the strength of the applied electric field. An example would be polydiacetylene on a lithium niobate substrate. For a magnetic field sensor, field sensor material 40 could comprise a magneto-optic material such as polydiacetylene doped with a suitable metal such as manganese or cobalt.

Figure 4:
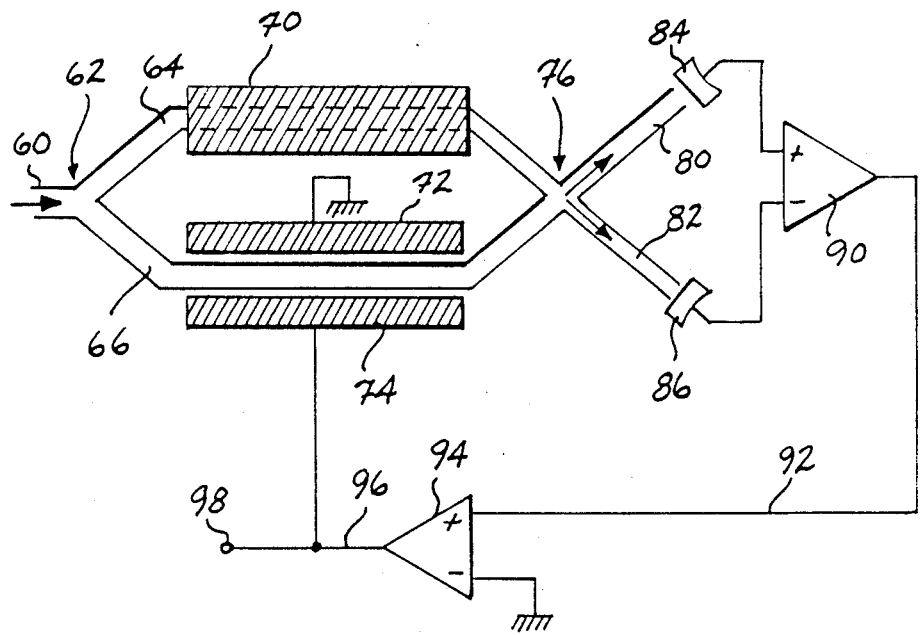
FIG. 4 is a diagram showing a second preferred embodiment of the field sensor of the present invention; and, FIG. 5 is a diagram of a third preferred embodiment of the invention.

A further preferred embodiment of the field sensor of the present invention is illustrated in FIG. 4. The field sensor is configured in a quadrature arrangement that comprises signal waveguide 60, coupler 62, sensing arm (waveguide) 64, reference arm (waveguide) 66, field sensing material 70, trim electrodes 72 and 74 and coupler 76. Coupler 76 is a 2×2 coupler, that combines radiation received through sensing arm 64 and reference arm 66 into output waveguides 80 and 82, such that each output waveguide in general receives radiation from both the sensing and reference arms. The optical signals in the output waveguides are converted to electrical signals by photodetectors 84 and 86, and the photodetector outputs are connected to the inputs of a difference amplifier 90. Difference amplifier 90 thus produces an output signal on line 92 having an amplitude equal to the difference between the amplitudes of the optical signals on output waveguides 80 and 82. This difference signal is input to the noninverting input of high gain amplifier 94, amplifier 94 having its inverting input connected to ground. The output of amplifier 94 on line 96 provides an output signal at terminal 98, which output signal is also coupled to trim electrode 74. Trim electrode 72 is grounded.

With the quadrature arrangement shown in FIG. 4, when the phase shift between the sensing and reference arms is 0° or 180°, all of the optical power will appear in one of the output waveguides. However, when the phase shift between sensing arm 64 and reference arm 66 is 90°, the optical signals in output waveguides 80 and 82 will be equal. Thus any variation from the 90° phase shift condition will cause difference amplifier 90 to produce a signal that is amplified by amplifier 94 and applied to trim electrode 74 to maintain the quadrature condition. The arrangement shown in FIG. 4 provides the advantages that the sensor operates at the highest sensitivity (quadrature) point, and that phase shifts in sensing arm 64 are not limited to $2\pi$.

With the arrangement shown in FIG. 4, for small phase shifts $\Delta\phi$, it can be shown that the power variation $\Delta P$ at one of photodetectors 84 or 86 is given by:

$$\Delta P = \Delta\phi \epsilon P_{in} \quad (1)$$

where $P_{in}$ is the input power, and $\epsilon$ represents the device losses. If one assumes that the detector/preamp hybrid is implemented by a device such as RCA3C095-2EL having an NEP of $4 \cdot 10^{-12}$ watts/hertz$^{\frac{1}{2}}$, that the bandwidth is 1,000 hertz, the signal-to-noise ratio is 100, the device loss coefficient is 0.1, and $P_{in}$ is 1 mwatt, then a $\Delta\phi$ value of $10^{-4}$ results. From this value, given presently available materials for use as the field sensing material and waveguide, typical field sensitivities can be estimated as follows: electric fields—0.3 volts/centimeter; temperature—$0.5 \cdot 10^{-5}$ degrees centigrade; and magnetic fields—$0.2 \cdot 10^{-7}$ Oersted squared.

Figure 5:
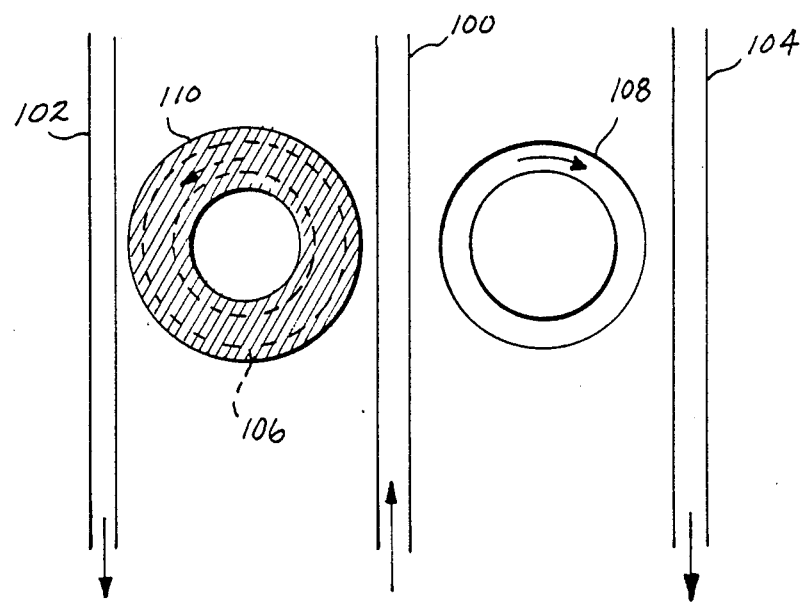

A further embodiment of the field sensor of the present invention is illustrated in FIG. 5. This embodiment comprises input waveguide 100, output waveguides 102 and 104, circular waveguides 106 and 108, and a circular strip of field sensing material 110 overlying circular waveguide 106. The illustrated arrangement is known in the art as a ring resonator. Light from input waveguide 100 is coupled into circular waveguides 106 and 108, and passes around each circular waveguide one or more times before being coupled into the adjacent output waveguide. Field sensing material 110 modifies the optical path length of circular waveguide 106, and thereby modulates the strength of the optical signal in output waveguide 102. Output waveguide 104 acts to provide a reference signal, and the field is determined by measuring the difference between the magnitude of the optical signals in waveguides 102 and 104. Althoug ring resonators have certain disadvantages, such as poor on-off ratios and large temperature sensitivities, the illustrated double ring structure substantially lessens these effects. In addition, the ring resonator structure has the advantage that light travels through the field sensing region many times, thus enhancing the sensitivity of the device.

While the preferred embodiments of the invention have been illustrated and described, further variations will be apparent to those skilled in the art. Accordingly, the invention is not limited to the illustrated embodiments, and the true scope of the invention is to be determined by reference to the following claims.

The embodiments of the invention in which an exclusive property or privilege is claimed are defined as follows:

1. An integrated optic electric field sensor for measuring the strength of an electric field, the sensor comprising:

an interferometer formed in a substrate, the interferometer comprising first and second arms, each arm having first and second ends and comprising an optical waveguide formed in the substrate, the interferometer further comprising field sensitive means having a physical property and positioned adjacent the first arm, the field sensitive means including means for varying the physical property in accordance with the strength of the electric field, and for thereby changing the optical path length of the first arm in accordance with the strength of the electric field;

means for coupling radiation into the first ends of the first and second arms; and means for combining radiation from the second ends of the first and second arms to produce an optical output signal having an amplitude that varies in strength with the strength of the electric field.

2. The sensor of claim 1, wherein the first arm comprises a material that exhibits stress induced refractive index changes, and wherein the field sensitive means comprises a piezo-electric material that expands or contracts in a direction normal to the direction of radiation propagation in the first arm as the strength of the electric field varies, whereby variation in the strength of the electric field varies the optical path length of the first arm, and thereby modulates the amplitude of the optical output signal.

3. The sensor of claim 2, wherein the first arm is fabricated from lithium niobate.

4. The sensor of claim 1, wherein the field sensitive means comprises an electro-optic material having an index of refraction that is either slightly less than, or greater than, the index of refraction of the first arm, the electro-optic material being selected such that the difference between the index of refraction of the field sensitive means and the first arm varies as the electric field varies, such that an optical signal in the first arm produces an evanescent field in the field sensitive means that varies with the strength of the electric field.

5. The sensor of claim 4, wherein the substrate comprises lithium niobate and the field sensitive means comprises polydiacetylene.

6. The sensor of claim 1, further comprising a trim electrode positioned adjacent the second arm, and means for receiving the optical output signal and for applying a voltage to the trim electrode such that the relative phase shift between the first and second arms is maintained approximately at quadrature.

7. An integrated optic magnetic field sensor for measuring the strength of an magnetic field, the sensor comprising:
   an interferometer formed in a substrate, the interferometer comprising first and second arms, each arm having first and second ends and comprising an optical waveguide formed in the substrate, the interferometer further comprising field sensitive means having a physical property and positioned adjacent the first arm, the field sensitive means including means for varying the physical property in accordance with the strength of the magnetic field, and for thereby changing the optical path length of the first arm in accordance with the strength of the magnetic field;
   means for coupling radiation into the first ends of the first and second arms; and
   means for combining radiation from the second ends of the first and second arms to produce an optical output signal having an amplitude that varies in strength with the strength of the magnetic field.

8. The sensor of claim 7, wherein the first arm comprises a material that exhibits stress induced refractive index changes, and wherein the field sensitive means comprises a magnetostrictive material that expands or contracts in a direction normal to the direction of radiation propagation in the first arm as the strength of the magnetic field varies, whereby variation in the strength of the magnetic field varies the optical path length of the first arm, and thereby modulates the amplitude of the optical output signal.

9. The sensor of claim 8, wherein the first arm is fabricated from lithium niobate.

10. The sensor of claim 7, wherein the field sensitive means comprises a magneto-optic material having an index of refraction that is either slightly less than, or greater than, the index of refraction of the first arm, the magneto-optic material being selected such that the difference between the index of refraction of the field sensitive material and the first arm varies as the magnetic field varies, such that an optical signal in the first arm produces an evanescent field in the field sensitive material that varies with the strength of the magnetic field.

11. The sensor of claim 10, wherein the magneto-optic material comprises doped polydiacetylene.

12. The sensor of claim 7, further comprising a trim electrode positioned adjacent the second arm, and means for receiving the optical output signal and for applying a voltage to the trim electrode such that the relative phase shift between the first and second arms is maintained approximately at quadrature.

13. An integrated optic temperature sensor, comprising:
   an interferometer formed in a substrate, the interferometer comprising first and second arms, each arm having first and second ends and comprising an optical waveguide formed in the substrate, the first arm comprising a material that exhibits stress induced refractive index changes, the interferometer further comprising field sensitive means positioned adjacent the first arm, the field sensitive means having a coefficient of thermal expansion different from that of the first arm, such that temperature variation causes expansion or contraction of the field sensitive material relative to the first arm in a direction normal to the direction of radiation propagation in the first arm, thereby varying the optical path length of the first arm in accordance with the temperature;
   means for coupling radiation into the first ends of the first and second arms; and
   means for combining radiation from the second ends of the first and second arms to produce an optical output signal having an amplitude that varies with temperature.

14. An integrated optic field sensor for measuring the strength of an applied field, the sensor comprising:
   an interferometer formed in a substrate, the interferometer comprising an input arm, two output arms positioned generally parallel to the input arm on opposite sides thereof; first and second ring resonators, each ring resonator comprising a circular waveguide positioned between the input arm and a respective one of the output arms, the waveguides being arranged in a substrate such that radiation in the input arm is coupled into the ring resonators and from the ring resonators to the output waveguides, the interferometer further comprising field sensitive means positioned adjacent the first ring resonator, the field sensitive means including means for varying the optical path length of the first ring resonator in accordance with the strength of the applied field;
   means for coupling radiation into the input waveguide; and
   means for measuring the strength of the optical signal in the first output waveguide in relation to the strength of the optical signal in the second output waveguide, to thereby measure the applied field.

* * * * *